United States Patent
Porras

(10) Patent No.: US 9,210,194 B2
(45) Date of Patent: *Dec. 8, 2015

(54) METHOD AND SYSTEM FOR PROTECTING DATA FLOW AT A MOBILE DEVICE

(71) Applicant: SRI International, Menlo Park, CA (US)

(72) Inventor: Phillip A. Porras, Cupertino, CA (US)

(73) Assignee: SRI INTERNATIONAL, Menlo Park, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/717,118

(22) Filed: May 20, 2015

(65) Prior Publication Data

US 2015/0256559 A1 Sep. 10, 2015

Related U.S. Application Data

(63) Continuation of application No. 13/659,680, filed on Oct. 24, 2012, now Pat. No. 9,047,463.

(60) Provisional application No. 61/666,565, filed on Jun. 29, 2012.

(51) Int. Cl.
*G06F 21/62* (2013.01)
*G06F 21/60* (2013.01)
(Continued)

(52) U.S. Cl.
CPC ............ *H04L 63/20* (2013.01); *G06F 21/53* (2013.01); *G06F 21/6218* (2013.01);
(Continued)

(58) Field of Classification Search
CPC ......... G06F 21/52; G06F 21/54; G06F 21/55; G06F 21/60; G06F 21/604; G06F 21/62; G06F 21/6209; G06F 21/6218; G06F 21/6281; H04L 63/20; H04L 63/105; H04L 63/1441
See application file for complete search history.

(56) References Cited

U.S. PATENT DOCUMENTS 6,487,665 B1 * 11/2002 Andrews et al. ................. 726/26
7,120,800 B2 * 10/2006 Ginter ................ H04N 21/8358
348/E5.006

(Continued)

OTHER PUBLICATIONS

Petkovic, Miodrag; Popovic, M.; Basicevic, Ilija; Saric, Djordje, "A Host Based Method for Data Leak Protection by Tracking Sensitive Data Flow," Apr. 11-13, 2012, Engineering of Computer Based Systems (ECBS), 2012 IEEE 19th International Conference and Workshops, pp. 267,274.*

(Continued)

*Primary Examiner* — Eleni Shiferaw
*Assistant Examiner* — Nelson Scott Giddins
(74) *Attorney, Agent, or Firm* — Barnes & Thornburg LLP; Thomas J. McWilliams; Edward F. Behm, Jr.

(57) ABSTRACT

A method and system for evaluating and enforcing a data flow policy at a mobile computing device includes a data flow policy engine to evaluate data access requests made by security-wrapped software applications running on the mobile device and prevent the security-wrapped software applications from violating the data flow policy. The data flow policy defines a number of security labels that are associated with data objects. A software application process may be associated with a security label if the process accesses data having the security label or the process is in communication with another process that has accessed data having the security label.

15 Claims, 6 Drawing Sheets

(51) Int. Cl.
   *G06F 21/50* (2013.01)
   *H04L 29/06* (2006.01)
   *G06F 21/53* (2013.01)
   *G06F 21/54* (2013.01)
   *G06F 21/52* (2013.01)

(52) U.S. Cl.
   CPC ......... *H04L 63/105* (2013.01); *H04L 63/1441* (2013.01); *G06F 21/52* (2013.01); *G06F 21/54* (2013.01); *G06F 21/60* (2013.01); *G06F 21/62* (2013.01); *G06F 21/6209* (2013.01); *G06F 21/6281* (2013.01)

(56) References Cited

U.S. PATENT DOCUMENTS

| | | | | |
|---|---|---|---|---|
| 7,467,414 | B2* | 12/2008 | Schlesinger | G06F 21/6218 707/999.001 |
| 7,480,655 | B2* | 1/2009 | Thomas | G06F 21/52 |
| 7,484,245 | B1* | 1/2009 | Friedman | G06F 21/52 380/283 |
| 7,512,236 | B1* | 3/2009 | Zhu | G06Q 20/027 380/255 |
| 8,055,622 | B1* | 11/2011 | Botes et al. | 707/640 |
| 8,255,988 | B2* | 8/2012 | Carpenter | G06F 21/575 710/5 |
| 8,281,410 | B1* | 10/2012 | Sobel | G06F 21/00 726/1 |
| 8,484,250 | B2* | 7/2013 | Chand | G05B 19/4188 707/790 |
| 8,671,455 | B1* | 3/2014 | Zhu | G06F 21/554 726/26 |
| 8,689,349 | B2* | 4/2014 | Sahita | G06F 21/6281 726/26 |
| 8,978,092 | B2* | 3/2015 | Balinsky | G06F 21/552 726/1 |
| 9,047,463 | B2* | 6/2015 | Porras | G06F 21/53 |
| 2002/0038296 | A1* | 3/2002 | Margolus | G06F 17/30097 |
| 2004/0181667 | A1* | 9/2004 | Venters, III | G06F 21/10 713/164 |
| 2004/0210906 | A1* | 10/2004 | Beresnevichiene | G06F 21/52 719/310 |
| 2005/0289061 | A1* | 12/2005 | Kulakowski | G06Q 99/00 705/50 |
| 2007/0006321 | A1* | 1/2007 | Bantz | G06F 21/6218 726/27 |
| 2007/0101435 | A1* | 5/2007 | Konanka | G06F 21/52 726/27 |
| 2007/0197261 | A1* | 8/2007 | Humbel | G06Q 30/00 455/558 |
| 2008/0303667 | A1* | 12/2008 | Rehman | G06F 21/31 340/572.1 |
| 2009/0113397 | A1* | 4/2009 | Wright, Sr. | G06F 21/552 717/127 |
| 2009/0260050 | A1* | 10/2009 | George | G06F 21/53 726/1 |
| 2010/0086230 | A1* | 4/2010 | Bala | H04N 1/603 382/276 |
| 2010/0132012 | A1* | 5/2010 | van Riel | G06F 21/53 726/1 |
| 2010/0217853 | A1* | 8/2010 | Alexander et al. | 709/223 |
| 2010/0223576 | A1* | 9/2010 | Serra | G06F 21/604 715/781 |
| 2011/0258443 | A1* | 10/2011 | Barry | H04L 9/3247 713/168 |
| 2012/0167162 | A1* | 6/2012 | Raleigh | G06F 21/57 726/1 |
| 2012/0180111 | A1* | 7/2012 | Velasco | G06F 21/62 726/4 |
| 2012/0198413 | A1* | 8/2012 | Dang et al. | 717/101 |
| 2013/0061284 | A1* | 3/2013 | Berengoltz | G06F 21/51 726/1 |
| 2013/0260730 | A1* | 10/2013 | Toy | H04M 1/72522 455/418 |
| 2013/0283335 | A1* | 10/2013 | Lakshminarayanan et al. | 726/1 |
| 2014/0331335 | A1* | 11/2014 | Deschenes | G06K 17/0016 726/28 |

OTHER PUBLICATIONS

Lap Chung Lam; Tzi-cker Chiueh, "A General Dynamic Information Flow Tracking Framework for Security Applications," Dec. 2006, Computer Security Applications Conference, 2006. ACSAC '06. 22nd Annual, pp. 463,472.*

Krishnamurthy, B.; Neogi, A.; Sengupta, B.; Singh, R., "Data tagging architecture for system monitoring in dynamic environments," Apr. 7-11, 2008, Network Operations and Management Symposium, 2008. NOMS 2008. IEEE, pp. 395,402.*

* cited by examiner

DATA FLOW POLICY DEFINITIONS

LABEL TRANSITIVITY – DATA READ EXAMPLE

LABEL TRANSITIVITY – SUBJECT TO SUBJECT EXAMPLE

METHOD AND SYSTEM FOR PROTECTING DATA FLOW AT A MOBILE DEVICE

CROSS-REFERENCE TO RELATED APPLICATION

This application is a continuation of U.S. Utility patent application Ser. No. 13/659,680 filed Oct. 24, 2012, issue date: Jun. 2, 2015, which claims the benefit of and priority to U.S. Provisional Patent Application Ser. No. 61/666,565 filed Jun. 29, 2012, each of which is incorporated herein by this reference in its entirety.

BACKGROUND

A myriad of software applications are now available for use on mobile computing devices such as smart phones, e-readers, and tablet computers, including many types of applications that have been traditionally associated with desktop or 'enterprise' environments. As a result, mobile devices are often used to access and/or store potentially sensitive or private information. At the same time, malicious software applications continue to be developed by organized cyber-espionage groups and others who seek to exploit the features of mobile devices to obtain critical data. A malicious application may appear to be a legitimate application and even perform legitimate functions, but, unbeknownst to the user, concurrently export or exfiltrate sensitive information from the mobile computing device. Additionally, some mobile device users may unintentionally reveal sensitive data due to inadvertence, carelessness, or a lack of technical savvy.

SUMMARY

According to at least one aspect of this disclosure, a data flow policy evaluation system for a mobile computing device embodied as executable instructions in one or more machine-accessible storage media includes a system call monitor to monitor system calls made by a plurality of security-wrapped software applications during execution of the security-wrapped software applications at the mobile computing device; and a data flow policy engine to generate policy decisions to enable the security-wrapped software applications to prevent the execution of system calls that would violate a data flow policy, where the data flow policy defines security labels, associates data flow policies with the security labels, and associates data objects with the security labels, and the data flow policy engine is configured to associate an executing process of a security-wrapped software application with a security label if the process accesses a data object having the security label; and associate another executing process with the security label if the other executing process is in communication with the executing process.

The system may include an access interceptor to prevent the security-wrapped software application from executing any system call that would violate the data flow policy. The other executing process may be a software application process invoked by the executing process. The data flow policy engine may associate the other executing process with the security label if the other executing process reads data from memory to which data has been written by the executing process.

According to at least one aspect of this disclosure, a system for evaluating data access requests at a mobile computing device, embodied as executable instructions in one or more machine-accessible storage media, includes a system call monitor to monitor system calls relating to data accesses made by an instance of a security-wrapped software application executing on the mobile computing device; and a data flow policy engine to associate data access tracking data with the instance of the security-wrapped software application, wherein the data access tracking data relates to data objects accessed by the instance and security labels associated with the data objects, and the security labels indicate conflicts of interest between or among the data objects; and generate data flow policy decisions based on the data access tracking data, wherein the policy decisions are based on one or more current and one or more previous data accesses made by the instance.

The data flow policy engine may store data access tracking data associated with each instance of the security-wrapped software application. The data access tracking data may indicate data that has been read by the executing instance of the security-wrapped software application, data that is currently being read by the instance, and data that has been written by the instance. The data flow policy engine may separately associate data access tracking data with each instance of the security-wrapped software application. The system may permit the executing instance of the security-wrapped software application to read data associated with a security label only if the instance has not read data associated with another security label that is in conflict with the security label. The system may permit the executing instance of the security-wrapped software application to read data associated with a plurality of security labels only if the instance is authorized to read data associated with each of security labels. The system may permit the executing instance of the security-wrapped software application to read data associated with a plurality of security labels even if the instance is not authorized to read data associated with each of the security labels, if the instance is authorized to read data associated with at least one of the security labels. The system may permit the executing instance of the security-wrapped software application to write data associated with a plurality of security labels only if the instance is authorized to read data associated with each of the security labels; and the instance has not written data associated with another security label that is in conflict with any of the security labels. The system may permit the executing instance of the security-wrapped software application to write data associated with one or more security labels only if the instance is not currently reading data associated with another security label that is in conflict with any of the security labels; and the instance has not written data associated with another security label that is in conflict with any of the one or more security labels. The data flow policy engine may define each security label as either public or private. The system may permit the executing instance of the security-wrapped software application to write data associated with a public security label only if the security-wrapped software application has not read data associated with a private security label; and the security-wrapped software application has not written data associated with the private security label.

According to at least one aspect of this disclosure, a system for enforcing a data flow policy at a mobile computing device, embodied as executable instructions in one or more machine-accessible storage media, includes a system call monitor to monitor system calls made by an instance of a security-wrapped software application executing on the mobile computing device; a data flow policy engine to: analyze the system calls using a data flow policy, wherein the data flow policy associates security labels with data objects and the security labels indicate conflicts of interest between or among data objects, associate a data object with a security label if the data object is produced by a data source having the security label or if the data object is created by a software application process having the security label, and associate the instance with the security label if the instance accesses the data object and the data object is associated with the security label; and a data flow policy enforcer to prevent the instance from executing a system call that violates the data flow policy. The data object may be associated with more than one security label.

According to at least one aspect of this disclosure, a data flow policy engine for a mobile computing device, embodied as executable instructions in one or more machine-accessible storage media, is configured to: evaluate system calls made by instances of security-wrapped software applications executing on the mobile computing device; associate a security label with an instance of a security-wrapped software application if the instance reads a data object having the security label, writes to a data object having the security label, or connects to a data source having the security label; wherein the security label indicates that the data object or data source has a conflict of interest with at least one other data object or data source; and generate a data flow policy decision usable by the security-wrapped software application to prevent the execution of any system call that would result in a conflict of interest.

The data flow policy engine may be configured to evaluate system calls made by the instances of security-wrapped software applications by interfacing with an access interceptor of each of the security-wrapped software applications. A data object or data source having the security label may have a conflict of interest with another object or data source if the data object or data source having the security label cannot be mixed with the other data object or data source. The security label may be defined as either public or private. In response to the executing instance of the security-wrapped software application attempting to perform a write operation on a data object having a public security label after reading another data object having a private security label, the data flow policy engine may be configured to: generate a copy of the data object; allow the write operation to be performed on the copy of the data object; deny the write operation on the data object; and associate the copy of the data object with the security label. The data flow policy engine may be configured to: associate a data access by another executing instance of the security-wrapped software application with the copy of the data object if the other instance is associated with the security label; and associate the data access by the other instance with the data object if the other instance is not associated with the security label.

BRIEF DESCRIPTION OF THE DRAWINGS

Aspects of this disclosure are illustrated by way of example and not by way of limitation in the accompanying figures. The figures may, alone or in combination, illustrate one or more embodiments of various aspects of this disclosure. For simplicity and clarity of illustration, elements illustrated in the figures are not necessarily drawn to scale. For example, the dimensions of some elements may be exaggerated relative to other elements for clarity. Further, where considered appropriate, reference labels may be repeated among the figures to indicate corresponding or analogous elements.

DETAILED DESCRIPTION OF THE DRAWINGS

Figure 1:
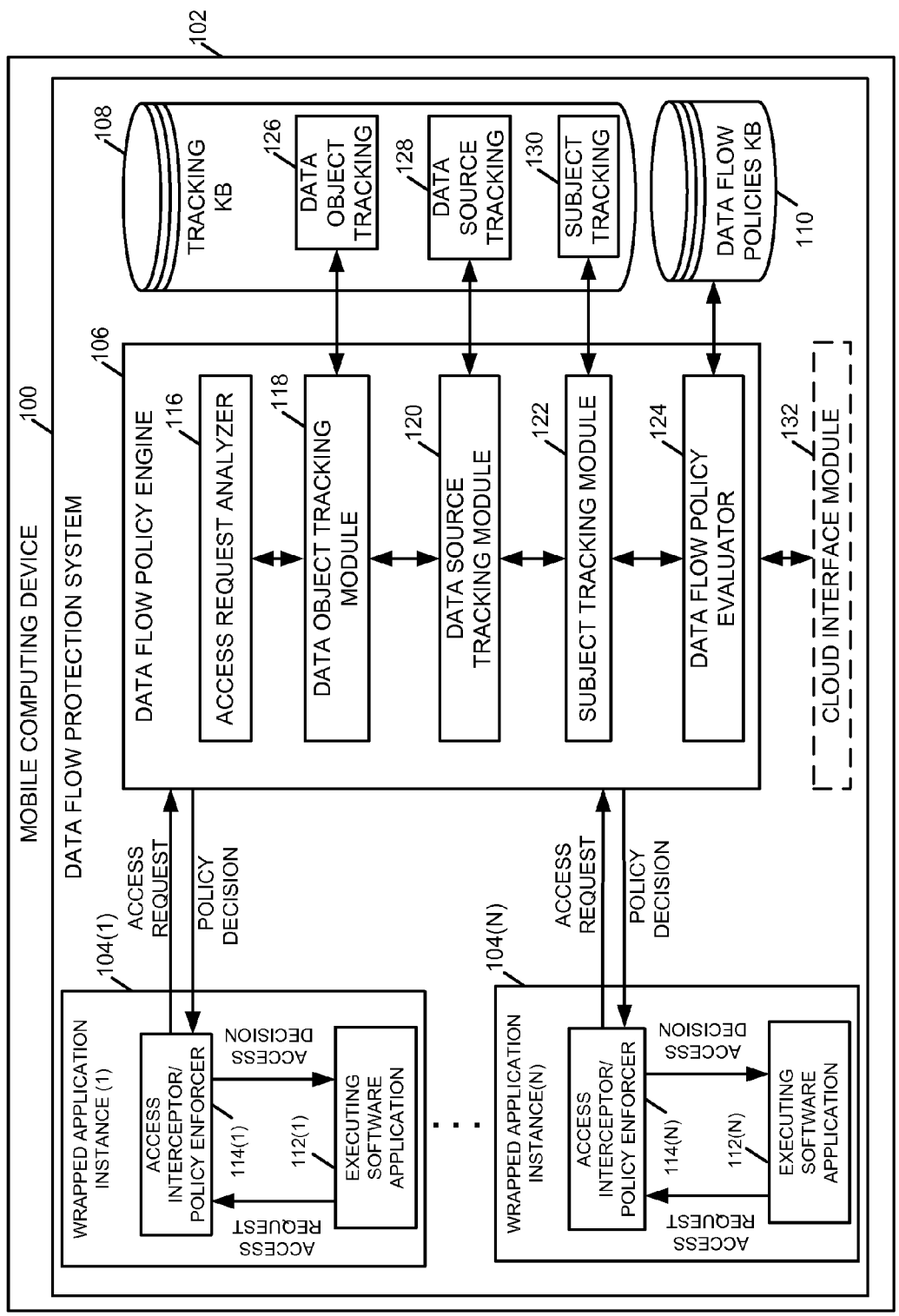
FIG. 1 is a simplified module diagram of at least one embodiment of a data flow protection system for a mobile computing device.

While the concepts of the present disclosure are susceptible to various modifications and alternative forms, specific exemplary embodiments thereof have been shown by way of example in the drawings and are described in detail herein. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

Referring now to FIG. 1, at runtime, a data flow protection system 100 monitors and evaluates data access requests made by instances of security-wrapped software applications 104 (1) . . . 104(N) (where N is a positive integer) running on a mobile computing device 102. As used herein, a "data access request" (or simply, "access request" or "access") refers to any type of command or instruction issued by an executing software application 112 that, if executed, would result in the application 112 opening a data object, reading data from a data object, creating a data object, writing data to a data object, deleting a data object, connecting with a data source, or performing similar operations.

The system 100 includes a data flow policy engine 106, which interfaces with a tracking knowledge base ("tracking kb") 108 and a data flow policies knowledge base ("policies kb") 110 to evaluate and track data access requests made by the application instances 104(1) . . . 104(N) in real time. The data flow policy engine 106 uses the tracking kb 108 and the policies kb 110 to evaluate whether a requested data access would violate a previously specified data flow policy. As explained in detail below, the system 100 can implement dynamic, context-sensitive data flow policies that can be enforced with respect to multiple software applications running on the mobile device 102.

The system 100 instantiates the desired security policies of an organization or mobile device user as data flow policies rather than, e.g., application access policies. Using the data flow policies, the system 100 can protect information assets that are accessible via the mobile device 102 from a wide variety of potential security breaches, such as direct data exfiltration by malicious applications, indirect data exfiltration by proxy (e.g., "confused deputy" attacks), user privacy violations, internal mobile device data integrity and confidentiality violations, direct and indirect collusion attacks, inadvertent or careless exporting of sensitive data by the mobile device user, surreptitious connections made by malicious applications to unauthorized sites while accessing sensitive data, and breaches that may be facilitated by pre-infected host platforms. Moreover, the system 100 employs a "just in time" approach so that the security-wrapped application instances 104 can continue to run normally on the mobile device 102 unless and until an unpermitted data access is actually attempted.

Each executing software application 112(1) . . . 112(N) interfaces with a corresponding access interceptor/policy enforcer module 114(1) . . . 114(N). Each of the access interceptors/policy enforcers 114(1) . . . 114(N) monitors system calls that are initiated by its respective application 112. If a system call contains a data access request, the access interceptor/policy enforcer 114 communicates the data access request to the data flow policy engine 106, receives data flow policy decisions from the data flow policy engine 106, determines how to respond to the policy decisions made by the data flow policy engine 106, and communicates access decisions to the executing application 112.

If a policy violation occurs, the access interceptor/policy enforcer 114 may continue execution of its corresponding application 112, temporarily suspend execution of the application 112, or close the application 112. The access interceptor/policy enforcer 114 may determine how best to handle policy violations based on rules or preferences that may be specified or configured by the application developer, a system administrator, or the end user, for example.

As used herein, a "security-wrapped" application refers to an executable application package that includes both conventional executable software application code and the access interceptor/policy enforcer code, configured so that the access interceptor/policy enforcer code is executed at runtime in response to system calls made by the executing application 112. Further, the term "wrapped" as used herein refers to the technique of associating the access interceptor/policy enforcer code with executable application code without changing the underlying source code for the application and without modifying the operating system or other programs that may exist on the mobile device 102.

Various methods may be used to wrap an executable software application to include the access interceptor/policy enforcer code. Some techniques for wrapping executable software application code with such security monitoring and enforcement code are described in Saidi et al., U.S. patent application Ser. No. 13/411,072, filed Mar. 3, 2012, which is incorporated herein by this reference in its entirety. As described therein, the access interceptor/policy enforcer code is incorporated with the executable application code into an executable application package (or "apk file," in some embodiments) without affecting the original application source code.

In operation, an executing application 112 may initiate a data access request by a variety of different means, such as any type of input/output (I/O) command. As noted above, the access interceptor/policy enforcer 114 operates at the system call level, and intercepts system calls that pertain to data access requests, prior to their execution by the mobile device 102. Some examples of the types of system calls that may be intercepted by the access interceptor/policy enforcer 114 include read( ), write( ), access( ), connect( ), ioctl( ), execvp( ), fork( ), and dlopen( ) calls, including file I/O, SMS (Short Message Service) or other messaging service I/O, Internet I/O, Process I/O calls, Device-ID calls, and/or other similar system calls. In this way, use of the data flow policy engine 106 can be reserved for only those circumstances in which an executing application 112 attempts to perform an operation that may compromise the security of data created by, stored at or available to the mobile device 102. Of course, in other embodiments, other system calls may be monitored and intercepted in a similar fashion, alternatively or in addition to those mentioned above.

Upon intercepting a system call corresponding to a data access request, the access interceptor/policy enforcer 114 communicates the access request to the data flow policy engine 106. In turn, the data flow policy engine 106 determines whether the intercepted access request conforms to one or more of the data flow policies contained in the policies kb 110, and communicates a corresponding policy decision to the access interceptor/policy enforcer 114 without otherwise affecting the operation of the application 112.

The access interceptor/policy enforcer 114 processes the policy decision and determines what effect the policy decision may have (if any) on the execution of the application 112. If the access interceptor/policy enforcer 114 determines, based on the policy decision rendered by the data flow policy engine 106, that an access request should be denied, the access interceptor/policy enforcer 114 may, for example, alert the user prior to denying the request, or present a prompt and allow the user to decide whether to execute the requested data access. If the access interceptor/policy enforcer 114 determines that an access request should be permitted, the execution of the application 112 continues without any noticeable interruption.

The data flow policy engine 106 includes an access request analyzer 116, a data object tracking module 118, a data source tracking module 120, a subject tracking module 122, and a data flow policy evaluator 124. As should be appreciated by those skilled in the art, the various modules 106, 114, 116, 118, 120, 122, 124, 130, 132 of the system 100 are implemented as computer software, firmware, hardware, or a combination of any of these, in different embodiments of the system 100.

The access request analyzer 116 receives data access requests that have been initiated by the one or more security-wrapped application instances 104(1) . . . 104(N)). Herein, for ease of discussion, security-wrapped application instances 104(1) . . . 104(N) may be referred to as "subjects." As used herein, the term "subject" refers to any executing or recently executed process or instance of a security-wrapped software application, including processes that are spawned by, invoked by, awakened by, executed by, or otherwise in communication with a subject 104 (and such processes may be referred to as subjects, as well).

The access request analyzer 116 may parse an access request to determine the particular data object, data, and/or data source to which access is being requested, the subject requesting the access, and/or the type of access request (e.g., whether a read, write, or data source connection is being requested). The access request analyzer 116 may forward that information to one or more of the tracking modules 118, 120, 122 and/or the data flow policy evaluator 124. Once an access request has been evaluated by the data flow policy evaluator 124 in view of the policies kb 110 and the tracking kb 108, as applicable, the data flow policy engine 106 transmits a corresponding policy decision to the access interceptor/policy enforcer 114 associated with the application 112 that initiated the access request.

A policy decision may take the form of, e.g., one or more instructions, arguments and/or parameters that are passed back or otherwise made available to the access interceptor/policy enforcer 114. As noted above, the access interceptor/policy enforcer 114 determines what, if anything, the subject 104 should do in response to the policy decision, and issues an access decision back to the executing application 112 as needed. The access decision may take the form of, e.g., an instruction, argument and/or parameter that is passed back or otherwise made available to the application 112. The access decision may result in the application 112 executing the access request and continuing normal operation, ignoring the access request and continuing normal execution, suspending execution (e.g., to wait for user feedback), or closing, for example.

The data flow policy engine 106 uses a system of security labels to "follow" data implicated by the data access requests that are made by the various subjects 104. As used herein, the term "security label" refers to a common or proprietary topic area, label or tag that can be used to identify data objects, data sources, and/or subjects that have one or more data flow policies associated therewith (e.g., that require different treatment for security purposes). Security labels may be "inherited" by data objects 206 and/or subjects 104 depending on the specifications of the data flow policy, via label transitivity, as described further below.

The tracking modules 118, 120, 122 track data objects, data sources, and subjects that are involved in data access requests, as well as their respective security labels, for each subject 104 during its operation. More particularly, the tracking modules 118, 120, 122 monitor and track read and write accesses involving data objects, requests to connect to data sources, and reads, writes, and inter-process communications made by the various subjects 104. The data object tracking module 118 interfaces with the data object tracking data store 126 to track security labels associated with data objects and assign security labels to data objects as they are accessed by subjects 104, in real time, in accordance with the policies kb 110. Similarly, the data source tracking module 120 interfaces with the data source tracking data store 128 to track security labels associated with data sources and assign the data source security labels to subjects 104 as they access the data sources, in real time, in accordance with the policies kb 110. Likewise, the subject tracking module 122 interfaces with the subject tracking data store 130 to track communications between subjects 104 as they occur, and assigns security labels to the subjects 104 in real time, in accordance with the policies kb 110. For example, the subject tracking data store 130 may include a list of subjects 104 that have been spawned by other subjects 104, and their associated security labels.

The tracking modules 118, 120, 122 interface with the tracking kb 108 to store and retrieve such tracking information as needed. The tracking kb 108 includes a data object tracking data store 126, a data source tracking data store 128, and a subject tracking data store 130, each of which may be embodied as one or more indexed or otherwise searchable stores of information (e.g., databases, lookup tables, lists, files, or any other electronic arrangement or structure suitable for storing tracking data). Each of the data stores 126, 128, 130 contains data object, data source, and subject tracking data, respectively, of the access requests made by the subjects 104. Such tracking data includes any security labels associated with the various data objects, data sources, and subjects involved in the access requests. The tracking kb 108 thus stores information about security labels associated with current and/or recent previous access requests made by each of the various subjects 104. For example, in some embodiments, the tracking kb 108 maintains a list of data accesses made by a subject 104 while it is running and then clears the list when the subject 104 closes or exits. At any given point in time, the tracking kb 108 may be maintaining such a list for each subject 104 that is currently running on the mobile device 102.

The data flow policy evaluator 124 executes computerized logic and/or algorithms to evaluate the data flow policies 110 as the subjects 104 are running on the mobile computing device 102. In doing so, the data flow policy evaluator 124 may access one or more of the data stores 126, 128, 130 and/or other data from the tracking kb 108 in order to apply the data flow policies to the access requests, to determine whether a policy violation has occurred.

All or portions of the data flow policy engine 106, the tracking kb 108, and/or the policies kb 110 may be stored on the mobile computing device 102 or located on one or more other computing devices. As such, some embodiments of the system 100 may include a cloud interface module 132 for communication with the various portions of the data flow policy engine 106, the tracking kb 108, and/or the policies kb 110 across a "cloud" or otherwise networked or distributed computing environment. An example computing environment in which the system 100 may be implemented is discussed below with reference to FIG. 5.

Figure 2A:
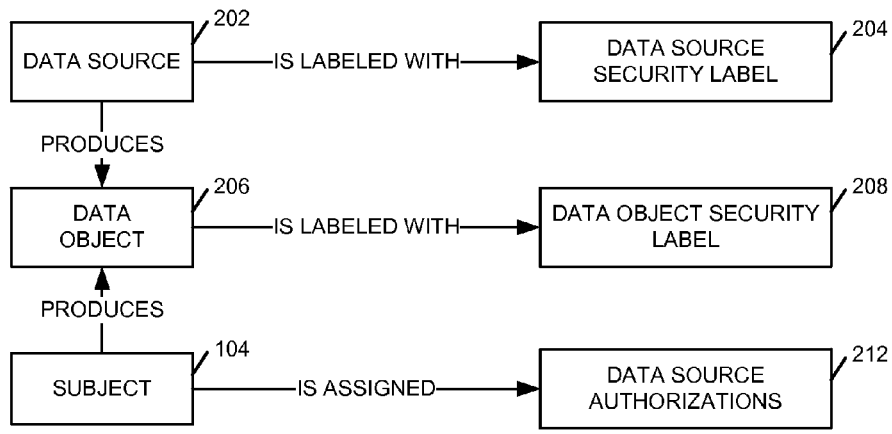
FIGS. 2A-2C are simplified models of various aspects of at least one embodiment of a data flow policy that may be implemented in connection with the system of FIG. 1.

Referring now to FIG. 2A, a data flow policy can be defined in terms of data sources 202, subjects 104, and data objects 206. In general, a data source 202 is a computerized entity that can be accessed by one or more subjects 104 and therefore can be a target of data access requests. As a result of an access, information may be obtained from a data source 202 and stored in one or more data objects 206. For example, a data source 202 may be a database, a network service, an SMS service, an email server, a critical data server, a memory (e.g., some form of random access memory or RAM) card, a user privacy data table, or a software application, such as a web browser or a proprietary enterprise software application.

Data sources 202 may be assigned one or more data source security labels 204. For example, a financial data server may be assigned a data source security label of "Finserv," while a web page may be assigned a data source security label of "Public." Subjects 104 can be assigned data source authorizations 212 (e.g. connect permissions). For example, a web browser may be authorized to access all data sources having the Public security label, but not data sources labeled Finserv, while a financial application may be authorized to access the financial data server and/or other data sources labeled Finserv, but not authorized to access data sources having the Public security label.

Data objects 206 can be created as a result of a subject 104's connection to a data source 202. Generally speaking, a data object 206 refers to a computerized (via e.g., computer programming) entity has an owner (e.g., a subject or a data source), stores data (e.g., an item of information that is produced from a data source or results from the execution of a subject), and has associated data access permissions as defined in the data flow policies kb 110. Data objects 206 may include, for example, a file stored on the mobile computing device 102, real-time geographic location data, a personal user record, a text message, or an email message. As such, a data object 206 may be a software application construct that has one or more elements of data stored in or associated with it. For example, an email message may be a data object that contains multiple pieces of data (e.g., addressee email addresses, sender email address, subject, and body of the message).

Each data object 206 is assigned or labeled with a data object security label 208. Some examples of data object security labels include company proprietary data, patient records, financial records, Internet data, SMS data, email, Global Positioning System ("GPS") data, RAM data, mobile device internal configuration information ("DeviceLocal"), application-specific configuration information ("AppLocal"), and/or private user data, among others.

The number and types of data source security labels and/or data object security labels (which may be referred to individually or collectively as "security labels" or the like) may vary depending on a particular implementation of the system 100 and/or the data flow policies 110, and may be customized according to any desired degree of granularity. For instance, some security labels may be further categorized as public or private. As an example, security labels for financial records and private user data may be designated as "private" security labels, whereas security labels such as the DeviceLocal and AppLocal security labels may be designated as "public" security labels. In some embodiments, the security labels 204, 208 may be defined by a data or network administrator. In other embodiments, the security labels 204, 208 may be derived programmatically from data sources, application types, and/or other features of the mobile computing device 102.

In some embodiments, the security labels 208 may be defined such that data objects produced by the same data source 202 are associated with the same security label 208. In this way, users and/or administrators can easily define data flow policies at a high level in relation to particular data sources 202 (e.g., "Do not allow financial data to leave this device!"). As an example, if a medical records data server is a data source 202, then all data objects 206 produced from that data source can be assigned the same corresponding security label (e.g., "medical records"), with the appropriate data flow policies being associated with that security label. As another example, an email server may be a data source 202. Each data object produced by or associated with the email server data source then may be associated with the same "email" security label, which corresponds to the email server data source and may be a "public" security label, and thus may not have any data flow policies associated with it.

Figure 2B:
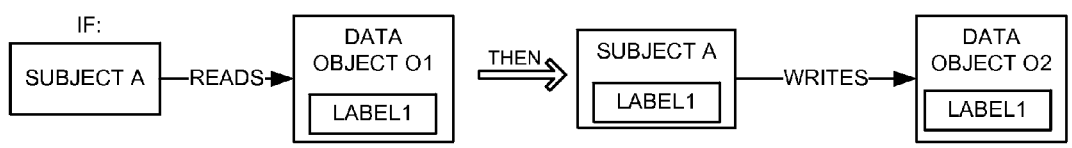

Data label transitivity provides that a data object that is born or created by a subject 104 that has previously read one or more other data objects having a particular security label also may be labeled with that particular security label, as illustrated in FIG. 2B, described further below. As such, in some cases, a data object may have more than one security label.

As an example, suppose that a process X has read a data object O1 having a security label A, and the process X has also read another data object O2 having a security label B. If the process X then writes a new data object O3, the new data object O3 will be labeled with both security label A and security label B. As another example, the process X may read the data object O1 and then write to the data object O2. In this example, the data object O2 will be labeled with both security label A and security label B. If the foregoing situation (e.g., the reading of multiple data objects having different security labels) occurs in an embodiment in which a data object may have only a single security label, then rather than permitting the data object O3 to have both security label A and security label B as in the above example, the data object tracking module 118 may create a third security label C to be treated as the concatenation (or intersection) of security labels A and B, and label the data object O3 with security label C.

Data objects 206 can be the target of read or write access requests, and data sources 202 can be the target of requests to access or "connect" to the data source. Such requests may be made by one or more subjects 104. Generally speaking, the terms "read" and "write" are used herein in accordance with their ordinary understanding in the computer arts. For example, the term "read" may refer to the opening of a data object or the reading of data from a data object, while the term "write" may refer to the original creation of a new data object, or to the modifying, deleting, or updating of an existing data object.

A subject 104 can become "tagged" with (or "inherit") a security label 208 through a read or write of a data object 206 or by connecting to a data source 202. Thus, a subject 104 can inherit a security label 208 of data objects 206 that it has read. A subject 104 may inherit a security label 208 of a data object 206 to which the subject 104 has written data. A subject 104 may also inherit a security label 208 of a data object 206 that the subject 104 is currently reading. Further, a subject 104 may inherit a security label 204 of a data source 202 to which the subject 104 has connected.

The desired assignments of security labels 204, 208 and access authorizations 212 to data sources 202, data objects 206 and subjects 104, as well as any conflict of interest rules associated with the security labels 204, 208, can be defined in the policies kb 110 according to the requirements of a particular design or implementation of the system 100. In operation, data accesses implicating these assignments, associations and relationships can be tracked and stored in the tracking kb 108 for use by the data flow policy engine 106 in evaluating the policies 110.

Referring now to the policies kb 110 of FIG. 1, data flow policies contained therein include information, such as arguments, parameters, and/or rules, related to data flow protection and/or security, which may be used by the data flow policy evaluator 124 to determine whether an attempted data access would contravene the data flow policy. In some embodiments, one or more of the policies 110 may be predefined or preconfigured (e.g., default policies) and/or may be automatically configured by the system 100 based on, for example, one or more aspects of the mobile computing device 102, an application 112, and/or other factors. The policies 110 may be defined or configured by, e.g., a network administrator or by a user of the mobile device 102, or programmatically by the system 100.

Depending on the particular context or use of the mobile computing device 102, a wide variety of policies 110 may be implemented in different embodiments. For example, a data flow policy 110 for company-owned mobile devices may specify different data flow rules than a data flow policy for personal mobile devices. In developing a data flow policy 110, the administrator may consider the level of required protection in view of the potential risk of a variety of potential threats as mentioned above.

The data flow policies may specify groups of security labels that are to remain separated from one another (e.g., data having one security label cannot be mixed with data having another security label in the group). Stated another way, a data flow policy may include rules that define conflicts between or among security labels, such that if data objects having those security labels were to be mixed with one another during an application instance, a conflict of interest would occur. Such a data flow policy can be used to, for example, ensure that a health care worker accessing one patient's files cannot simultaneously (in the same application instance) access another patient's data, or to ensure that the health care worker cannot access a patient's files while also accessing a public data source (such as the Internet).

As an example, a data flow policy may require that data objects labeled with security label A, security label B, and security label C be kept separated from one another. This can be represented using set notation as follows: DFP(1)=(A, B, C). If a subject (e.g., an application instance or executing process) S accesses both data having security label A and data having either security label B or security label C, then the DFP(1) data flow policy has been violated. As another example, a data flow policy may require that data having the security label A be kept segregated from both data having the security label B and data labeled with the security label C (and, implicitly, that the security labels B and C can be mixed). This can be represented using set notation as follows: DFP(2)=([A,B], [A,C]). If a subject Q accesses data associated with security label B and accesses data associated with security label C, then the DFP(2) policy has not been violated because the DFP(2) policy does not require those security labels to be kept segregated. In this example, the data having the security labels B and C may be "mixed." In this example, a subject 104 can be permitted to access data having security label C even though it has already accessed data having security label B (in the same application instance), but another subject 104 that has accessed data having security label A cannot also access data having security label B (during the same application instance).

Referring now to FIG. 2B, a data flow policy that provides data label transitivity may specify that if a data object O1 is associated with a security label, label1, and a subject A reads the data object O1, then both the subject A and any data written by the subject A (e.g., a data object O2) must also be associated with the data object O1's security label, label1, and thus will be subject to any data flow policies associated with that security label.

To implement the associations of data objects with security labels, the data object table 126 may indicate which security label(s) are associated with data objects accessed by the various subjects 104. The data object tracking module 118 may update the data object table 126 to include new data objects and/or security labels over time, as the various subjects 104 are executed at the mobile device 102 or as may be specified by, e.g., a user or data administrator.

In some cases, the data object tracking module 118 may update the data object table 126 to modify the security labels associated with data objects. For example, if a process P1 reads a data object X having a security label A, where the label A indicates confidential information, and then writes data to an data object Y, a data label transitivity policy may be implicated. But for the data label transitivity policy, the data object X may include confidential information that was read by the process P1 in data that P1 writes to the data object Y. To prevent confidential information from being passed from P1 to Y, the data object tracking module 118 may modify the data object table 126 to associate the security label A with the data object Y, in addition to any other security labels already assigned to the data object Y. In other embodiments, the data object tracking module 118 may tag or otherwise label the data object Y itself with its (potentially multiple) associated security labels.

Figure 2C:
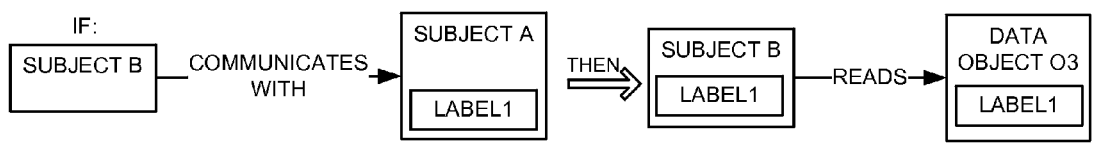

Data flow policies may be defined such that there is label transitivity to any subject 104 that accesses data associated with a specified security label (whether or not that security label is considered as designating confidential or proprietary information) from a process standpoint (subject to subject label transitivity). Referring to FIGS. 2B and 2C, a data flow policy that addresses subject to subject transitivity may specify that if the data object O1 has been read by the subject A, and another subject B is in communication with the subject A, then the subject B is deemed to have read the data object O1 as well. That is, the subject B inherits O1's security label, label1, from subject A. If the label1 is associated with any data flow policies, those data flow policies will be applied to future data accesses by the subject B. For example, if the subject B reads a data object O3, the data object O3 will inherit O1's label1 from the subject B.

Some examples of situations in which a subject A may be "in communication with" another subject B include those in which the subject B is a process spawned, invoked, awakened or executed by the subject A, in which the subject B reads data from memory to which the subject A has previously written, and/or any other form of direct or indirect interprocess communication.

To implement a subject to subject label transitivity policy, the data flow policy engine 106 may store associations between data objects, security labels and subjects in the subject tracking data store 130, and may use the subject tracking module 122 to update or otherwise maintain the subject tracking data store 130. For example, if a process P reads a data object O associated with a security label L, and then executes another process R, the process P may have read confidential or private information from the object O and passed the information to the process R. To prevent this situation, the subject tracking module 122 may modify the subject tracking data store 130 to indicate that the process R is associated with the process P, and to assign the label L to the process R. In some embodiments, the subject tracking module 122 may determine the data objects read by, written to, and currently read by a particular process by continuously analyzing a stream of system calls monitored by the access interceptor/policy enforcer 114 during the execution of the process. Alternatively or in addition, the subject tracking module 122 may operate in conjunction with the access request analyzer 116 to analyze the intercepted system calls and update the subject tracking data store 130.

The data flow policies may also address subject accesses of data sources. For example, an instance of a company's internal financial software application (a subject) may be permitted to access the company's financial data server (a private data source) but not an email server or the Internet (public data sources), while a gaming application or other downloaded third-party application may be permitted access to only the email server, the Internet, and other public data sources. In these and other ways, data flow policies that "follow the data" from subject to subject and/or from subject to data object, within and/or across multiple software applications, can be specified and implemented by the system 100.

The data flow policies may specify rules pertaining to the reading of data, writing data, accessing data, and/or the writing of public data as discussed below. Any of these and/or other policies 110 can be customized to be stricter or more lenient as may be required by a particular design or implementation of the system 100. Some computing environments, such as highly sensitive network environments, may implement a strict version of a data flow policy 110, whereas typical enterprise situations may only require a relaxed version of the same policy. For example, the system 100 may implement a strict or relaxed version of the read and write policies as shown in Table 1 and FIGS. 4A and 4B, described below.

TABLE 1

Read and Write Policies

| Policy | Rule | Example |
| --- | --- | --- |
| Strict Read | Process S can read data object O if S has not read a data object that has a security label that conflicts with any security label of O. | An investment bank application/process must not read investor A's portfolio after reading investor B's portfolio. |

TABLE 1-continued

Read and Write Policies

| Policy | Rule | Example |
|---|---|---|
| Relaxed Read | Process S can read data object O if O is labeled with a security label that S is specifically authorized to read. | A patient-record application/process is granted access to O, a patient record, but a game application/process is denied read access to O. |
| Strict Write | Process S can write a data object O if: 1) S is permitted to read data objects having O's label and 2) S has not written a data object having another security label that conflicts with O's label. | An enterprise proprietary database application/process P is permitted to write a proprietary file if P is permitted to read proprietary data and P has not previously written data files that are incompatible with proprietary data. |
| Relaxed Write | Process S can write a data object O if: 1) S is not currently reading a data object that has another security label that conflicts with O's security label and 2) S has not written a data object that has any other label that conflicts with the security label of O. | An enterprise proprietary database application/process P is permitted to write a proprietary file if P is not currently reading data that must be segregated from the proprietary database data and P has not previously written data files that must be segregated from the proprietary data. |

As noted above, the system 100 may implement one or more data source access policies, such as: a process P can connect to a data source that produces data having security label A if the process P has only read objects having security labels that do not conflict with the security label A, or P has only read objects having security labels that are public, and the process P has only written to objects having security labels that do not conflict with the security label A. An example of the above data source access policy is illustrated by FIG. 4C, described below.

The system 100 may implement a strict public write policy that a process P can write a public data object if P has not previously read or written data objects having non-public security labels. As discussed above, data label transitivity can be used to cause the process P to inherit a security label that is associated with data that has previously been read by the process. As such, data label transitivity can prevent public objects from being used to export sensitive data. For example, without data label transitivity, a process may read data that has a confidential security label C, write data having the security label C to a public data object, and then export it. By "export" or "exfiltrate," we mean any method or device (e.g., a data object, data source or subject) by which data may leave the mobile device 102, such as by text message, email, or the Internet.

In some cases, data label transitivity of public security labels (e.g., AppLocal and DeviceLocal) may need to be treated differently by the policies 110 than data label transitivity of private security labels (e.g., user private data and financial data). This may be the case if, for example, data associated with a private security label is (inadvertently or with malicious intent) written to one of the mobile device 102's configuration files, which has a public security label. If this occurs, normally, data label transitivity would tag the configuration file with the private security label and thus prevent other processes from being able to access the configuration file. As this may be an undesirable result, the system 100 may modify the public write policy as needed. For instance, the system 100 may implement a weak or relaxed public write policy, as shown in Table 2 and FIG. 4B, described below.

TABLE 2

Weak, Relaxed, and Strict Public Write Policies

| Policy | Rule |
|---|---|
| Weak | If a process S inherits a private security label O and S then attempts to write to a data object having a public security label, then the public security label dominates and the write is permitted. |
| Relaxed | If a process S inherits a private security label O and S then attempts to write to a data object having a public security label, then a 'shadow' data object is created. |
| Strict | If a process S inherits a private security label O and S then attempts to write to a data object having a public security label, then the public write is denied. |

As shown in Table 2, in an implementation of a relaxed public write policy, the data flow policy evaluator 124 may create a 'shadow' data object. By this we mean that in some embodiments, the system 100 makes a copy of the public data object attempting to be written to, and the write is applied to the copy. That is, any changes made to the public data object will be reflected in the copy, but the original data object is left unaffected. In such embodiments, the labeling of the original public data object and the shadow data object may be tracked by the data object tracking module 118.

According to the relaxed public write policy, processes that inherit the security label O (including the process S) will access the shadow data object in the future, whereas processes not labeled with security label O can continue to access the original public data object. In some cases, a new shadow data object may be created each time a process having a newly inherited data label attempts to write to the public data object. The shadow data object may be maintained on the mobile computing device 102 until the process ends or is closed. This version of the public write policy can protect confidential data from being exported via public object writes.

Some examples of implementations of the data flow policies discussed above, and their enforcement by the system 100 in specific situations, are described below. In the first example, suppose a mobile device user Alice has downloaded a New Application, an application 112 that she does not trust, to her mobile computing device 102. Alice wraps the New Application with a security wrapper as described above. At some point, Alice establishes a security policy on her mobile device 102, which is intended to prevent New Application from exporting her private data. Alice may use simple commands such as "don't export my private data!" that the data flow policy engine 106 interprets and instantiates as a corresponding data flow policy 110.

From Alice's command, the data flow policy engine 106 may interpret "export" to include all data sources that enable data to flow off the mobile computing device 102, and then automatically instantiate a data flow policy that defines a "user private" security label as being in conflict with all of: an "SMS" security label, an "Internet" security label, and an "email" security label. In other embodiments, Alice may be required to define and specify the particular security labels that are in conflict with the "user private" label. In this example, we further assume that Alice's data flow policy 110 includes the data source access and relaxed read data flow policies discussed above.

Now suppose Alice downloads, security-wraps, and invokes a Rogue Application, which happens to be a geo-tracking spyware application used by an unethical marketing company. The Rogue Application begins its execution as normal and contacts an external Internet site. The data flow policy engine 106 permits this access under the data source access policy described above. The Rogue Application instance next accesses DeviceLocal (public) data and probes a GeoDevice data source. Since the GeoDevice data source contains the user's geographic location data, it has the user private security label. These accesses are permitted by the data flow policy engine 106 under the relaxed read policy described above. The Rogue Application instance next attempts a direct connection to a remote Internet data sink. The data flow policy engine 106 prevents this connection under the data source access policy, because the Internet security label and the user private security labels are in conflict under Alice's data flow policy.

Now suppose the undeterred Rogue Application instance attempts to exfiltrate the GeoDevice data accessed via a confused deputy attack. In doing so, the Rogue Application instance executes an Internet browser application, which is permitted by the data flow policy. However, this scenario implicates the subject to subject data label transitivity described above. The browser application instance inherits the user private security label from the Rogue Application instance, because the Rogue Application instance has previously read data having the user private security label in the same instance. If the browser application instance now attempts to establish a connection with a remote Internet data sink, the operation will fail under the data source access policy. In this case, the system 100 allows the Rogue Application instance to operate normally except when it attempts an operation that violates Alice's data flow policy. This example illustrates that the data flow policy engine 106 can prevent direct sensitive data flow exfiltration by a malicious application, indirect sensitive data exfiltration by proxy, and user privacy violations.

In the second example, suppose a Trading Company issues smartphones (e.g., mobile computing devices 102) that enable its trader employees to provide live monitoring of trades internal to the Trading Company. The Trading Company installs an application 112, Trusted Trade Application, on the smartphones and security-wraps the application 112 as described above. The Trading Company establishes a security policy to "prevent financial security data from leaking off the smartphones!" Similar to the first example, the data flow policy engine 106 may interpret the words "prevent," "financial," and "leaking" and implement a corresponding data flow policy 110. The data flow policy engine 106 may instantiate a data flow policy that defines a financial security label as being in conflict with all of: an SMS security label, an Internet security label, and an email security label. In some embodiments, the Trading Company (e.g., its network or security administrator) may be required to define and specify the particular data flow policies via a user interface of the system 100.

Suppose that the data flow policy 110 instantiated on each Trading Company smartphone includes the data source access, relaxed read, strict write, and relaxed public write data flow policies 110 discussed above. Additionally, assume for this example that the Trusted Trade Application is authorized to access a financial data server, a software update site, DeviceLocal, and AppLocal data sources.

Now suppose Trading Company's smartphones are infiltrated by a market competitor, which installs another application 112, Rival Application, on the smartphones. The mobile device 102 detects the installation and security-wraps the Rival Application. The Rival Application is authorized by the system 100 to access the SMS, Internet, email, peer application, DeviceLocal, and AppLocal data sources. Now suppose that the Rival Application is invoked by a user or awakened by another process, and receives a remote command to initiate an attack on the smartphone. The data flow policy engine 106 permits this access under the data source access policy described above. The executing Rival Application instance next probes the network and attempts to connect to the financial server. The Rival Application instance is not authorized to access the financial server data source, so the data flow policy engine 106 denies this access request.

Next, the Rival Application instance collects data produced by other applications associated with the peer application security label and attempts to send the collected data to a remote data sink. The data flow policy engine 106 permits access to the data having the peer application security label under the relaxed read policy described above, and allows the remote connection under the data source access policy.

Now suppose the executing Trusted Trade Application instance attempts to connect to the software update site to download upgrades and/or patches. The data flow policy engine 106 permits access to the software update site under the data source access policy. The Trusted Trade Application instance next attempts to connect to the financial data server to access financial data (i.e., data having the financial security label), which is permitted by the data flow policy engine 106 under the data source access policy. In this case, the Trusted Trade Application has explicit authorization (e.g., as established by a data administrator) to access the software update site and the financial data server.

Suppose the Trusted Trade Application instance now attempts to write financial security data F. The data flow policy engine 106 permits this write under the strict write policy described above. Next, the Trusted Trade Application instance attempts to write data P to a data object having the AppLocal security label, which is a public label. This creates a potential data leak. Instead of preventing the write completely, under the relaxed public write policy, the data flow policy engine 106 creates a shadow object to allow the write. That is, the data flow policy engine 106 creates a copy $P_{COPY}$ of the data P and associates the financial security label with the data $P_{COPY}$. The write operation is then performed on $P_{COPY}$ but P remains unchanged.

Next, the executing Rival Application instance attempts to read the data P. The data flow policy engine 106 permits the Rival Application instance to read the data P, which has the AppLocal security label, under the relaxed read policy, and allows a remote connection under the data source access policy. However, the Rival Application instance is unable to access $P_{COPY}$ even under the relaxed read policy, because $P_{COPY}$ has the financial data label, which conflicts with the Rival Application instance because the Rival Application instance has previously read a public data object (P, which has the AppLocal security label). In this example, the data flow policy engine 106 prevents direct sensitive data exfiltration by a malicious application and exfiltration by the collusion.

In the third example, suppose a hospital has developed a dedicated tablet computer (e.g., a mobile computing device 102) and an application 112, Patient View, which enable doctors to access patient records throughout the hospital. The chief information officer of the hospital is concerned that Patient View could contain a vulnerability that allows confidential patient records to be leaked off the tablet computer. The officer desires that Patient View complies with the strict confidentiality and integrity requirements of health care laws and prevents doctors from mishandling patient records. As such, the officer security-wraps Patient View and specifies a strict policy that no patient record data can leave the tablet computers. As discussed above, in some embodiments, the data flow policy engine 106 may intelligently interpret user-specified commands in establishing a data flow policy. In other embodiments, the officer may be required to more particularly specify the data flow policy (e.g., using a fill-in form).

In the present example, the data flow policy engine 106 instantiates a data flow policy on each of the dedicated hospital tablet computers, which defines a patient record security label as conflicting with all of: an SMS security label, an Internet security label, an email security label, and a RAM security label. For this example, we assume that Patient View is authorized to access the hospital database, software update site, DeviceLocal, and AppLocal data sources, and other executable software applications 112 on the tablet computer are authorized to access the SMS, Internet, email, peer, Device Local, and AppLocal data sources. Further, we assume that the present data flow policy 110 includes the data source access, strict write, and strict read data flow policies discussed above.

Now suppose that an executing instance of Patient View attempts to connect to the hospital database. The data flow policy engine 106 permits the connection under the data source access policy and because Patient View is authorized to access the hospital database data source. Next, one of the hospital's doctors creates a spreadsheet and attempts to store (i.e., write) the spreadsheet to a file O on the tablet computer, for example, in DeviceLocal. The data flow policy engine 106 permits the write operation under the strict write policy but updates the tracking kb 108 to associate the patient record security label with the file O.

Some time later, the doctor executes the spreadsheet application again. At the outset, no data objects have been read by the new instance of the spreadsheet application (i.e., no data labels are associated with this instance of the spreadsheet application, yet), because each instance of an application is treated autonomously. Suppose the current spreadsheet application instance then attempts to open the file O. The data flow policy engine 106 allows the read operation because the spreadsheet application instance is authorized to access DeviceLocal and the read operation is authorized under the strict read policy. Suppose the same instance of the spreadsheet application is then used to write to a spreadsheet P. The data flow policy engine 106 allows the write operation to P; however, the data flow policy engine 106 updates the tracking kb 108 to label P with the patient record security label, because the file O was previously read by the instance of the spreadsheet application and O has the patient record security label.

Now suppose the doctor invokes a security-wrapped email application. As with the spreadsheet application, the set of data objects read by the instance of the email application is, initially, the empty set, and thus, no security labels are associated with the newly-invoked email application instance. The email application instance then attaches the spreadsheet P (i.e., a read operation) to an email message. This is permitted by the data flow policy engine 106 under the strict read policy. Now, the email application instance attempts to establish a connection with a Simple Mail Transfer Protocol (SMTP) server to send the email message with the spreadsheet attached. The data flow policy engine 106 denies this access request, because it would violate the data source access policy described above. That is, the email application instance has previously read data having a security label that is in conflict with the email security label.

In some embodiments, the access interceptor/policy enforcer 114 may receive the policy violation from the data flow policy engine 106, deny the access request, and provide the doctor with a warning or alert indicating the reason(s) for denying the access request. In this example, the data flow policy engine 106 issues a policy decision that is used by the email application instance to prevent inadvertent or careless exporting of sensitive data and enforce internal data integrity and confidentiality restrictions.

In each of the examples described above, the system 100 allows each subject 104 to execute normally unless an access request violates an applicable data flow policy 110. When a data flow policy 110 is violated, the system 100 can prevent the data object or data source access prior to any exfiltration of data. In many embodiments, there is minimal performance impact because the data flow policy engine 106 focuses only on system calls that involve data object accesses, data source connections, and process invocations, which occur infrequently during the normal operation of most applications.

Figure 3:
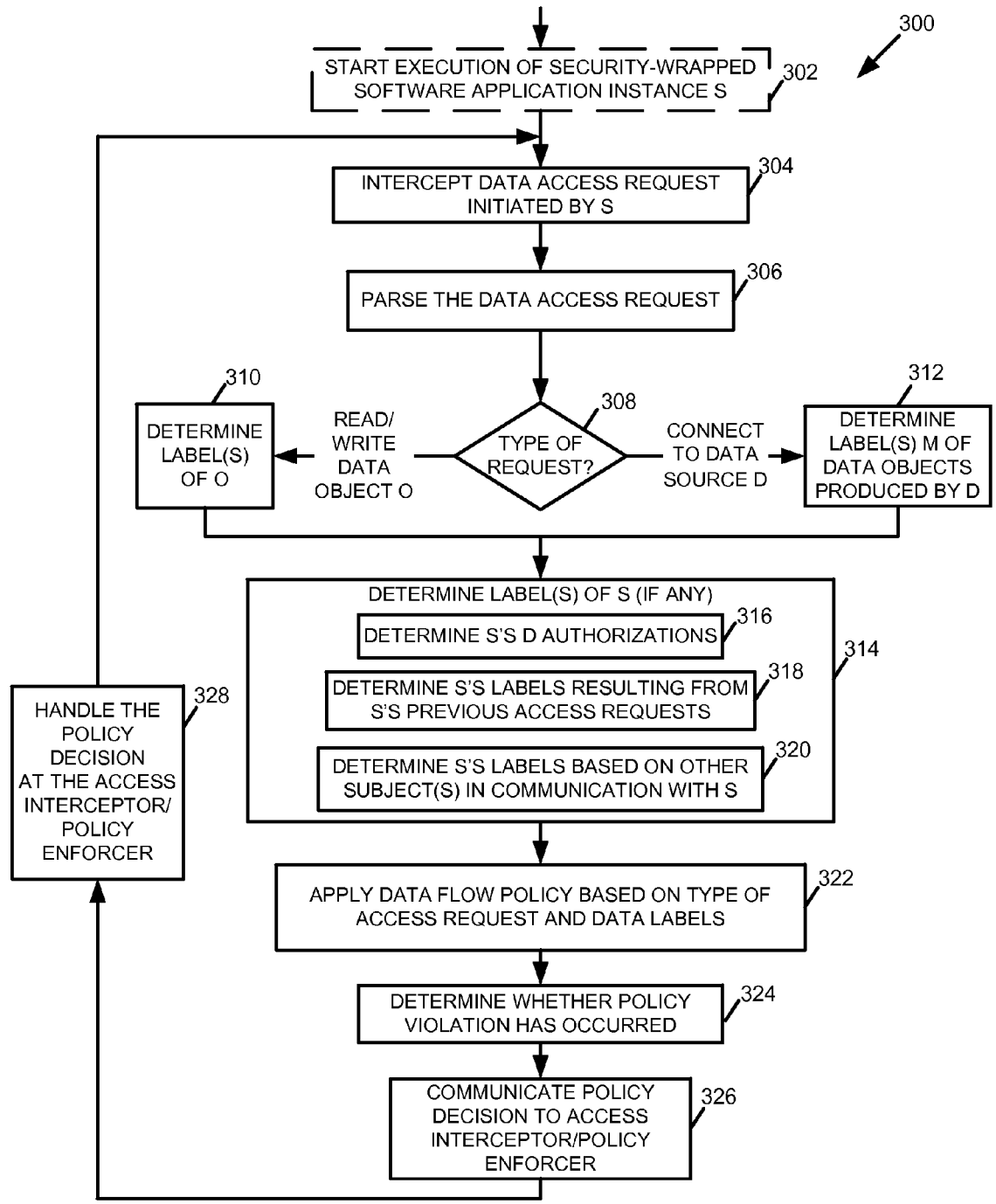
FIG. 3 is a simplified flow diagram of at least one embodiment of a method for evaluating a data access request made by an executing instance of a security-wrapped software application.

Referring now to FIG. 3, an illustrative method 300, which may be implemented as one or more computer-executable instructions, routines, or processes by which the system 100 and/or one or more of the modules 106, 116, 118, 120, 122, 124, 132 may evaluate data flow policies 110 during the execution of the security-wrapped application instances 104, is shown. At block 302, execution of an instance S of a security-wrapped application at the mobile device 102 begins (as initiated by a mobile device user or an automated process, for example). As should be understood, the activities referred to by block 302 can occur independently of the method 300 but be detected by the method 300.

At block 304, the method 300 intercepts an access request initiated by the instance S. To do this, the method 300 may monitor selected system calls made by the instance S and intercept certain types of system calls (e.g., calls that request access to data objects or data sources) as discussed above. At block 306, the method 300 may parse, interpret, or otherwise analyze the intercepted access request to determine the type of request. For example, the method 300 may determine if the instance S is attempting to read data, write data, or access a data source. Additionally, the method 300 may determine the identity of any data object or data source identified in the access request.

At block 308, the method 300 evaluates the intercepted access request to determine its type. If the method 300 determines that the instance S is requesting access in order to read or write data a data object O, then at block 310, the method 300 may determine which, if any, security labels are associated with the object O. In some embodiments, the method 300 may retrieve security label information associated with the data object O from the data object table 126 of the tracking kb 108.

If, in block 308, the method 300 determines that the instance S is requesting access to connect to a data source D, then at block 312, the method 300 may determine which, if any, security labels are associated with the data source D. In some embodiments, the method 300 may retrieve security label information associated with the data source D from the data source table 126 of the tracking kb 108.

Following block 310 or block 312, as the case may be, at block 314, the method 300 determines which, if any, security labels are associated with the instance S. As discussed above, subjects (such as the instance S) can inherit security labels as a result of expressly defined data source authorizations (block 316), previous data accesses made by the subject (block 318), or data accesses made by other subjects that are in communication with the current subject (block 320). In some embodiments, the method 300 may retrieve information associated with the instance S from the subject tracking data store 130 of the tracking kb 108, as discussed above. In the illustrative embodiments, each instance of a security-wrapped application is associated with security labels autonomously of other instances of the same application. That is, two instances of the same application may have different security labels associated with them at different points in time, depending on the behavior of the application in those separate instances.

At block 322, the method 300 determines which of the data flow policies 110 are associated with the access request based on security labels learned at one or more of the foregoing blocks 310, 312, 314, 316, 318, 320. That is, the method 300 identifies which of data flow policies 110 applies to the particular intercepted access request based on the nature of the current access request and the associated security labels (if any), as discussed above. In some embodiments, different data flow policies 110 may be applied depending on the access request, the mobile computing device 102, information obtained from the tracking kb 108, and/or other circumstances and factors.

At block 324, the method 300 determines, based on the logic of the applicable data flow policy or policies 110 as applied to the access request at block 322, whether a violation of the data flow policy has occurred. This policy decision is then communicated to the access interceptor/policy enforcer 114 as, e.g., a command, instruction, argument, or parameter, at block 326. In some embodiments, the method 300 may store data relating to the policy decision in the tracking kb 108.

The policy decision is handled by the access interceptor/policy enforcer 114 at block 328. For example, if the method 300 determines that the access request is consistent with the applicable data flow policy or policies 110, then at block 328, the access interceptor/policy enforcer 114 may transmit an access decision to the application 112 indicating that the access request is permitted or at least has not been prevented.

If, at block 324, the method 300 determines that the access request is inconsistent with one or more of the applicable data flow policies 110, then in some embodiments, at block 328, the method 300 may display a warning message and/or prompt to the user on a display of the mobile computing device 102. For example, the mobile computing device 102 may display text reading: "Warning! Your email client has attempted to connect to an external server while it has accessed confidential patient health records from the patient record database. This is a hospital policy violation," or any other suitable warning, on the display.

In some embodiments, the method 300 may prevent an unauthorized access without displaying any message or prompt to the user. In other words, execution of the application instance S may continue normally without the user ever becoming aware that a policy violation was attempted. Alternatively or in addition, the method 300 may communicate policy decisions and/or access decisions to other computing devices. For example, the method 300 may send a message to another computing device via the cloud interface module 132, to indicate that a policy violation has been attempted or that a data access request has been denied (e.g., as a text message or email alert to a data administrator).

If the method 300 determines at block 328 that the access request is permitted, the instance S may execute the requested access and continue normal execution. If, however, the method 300 determines at block 328 that the access request should be denied, then the instance S may quietly skip the requested access and continue normal execution. In some embodiments, the instance S may continue by executing the application 112's instruction or code that immediately follows the denied or skipped access request. In other embodiments, the instance S may resume execution at some other point in its executable instructions or code. In still other embodiments, the instance S may exit or close as a result of the attempted policy violation.

Following block 328, the method 300 continues to evaluate data access requests made by the application instance S until the instance S is closed or exits. The method 300 returns to block 304 in order to intercept other access requests as appropriate. In other words, the method 300 does not repeat itself unless and until the instance S issues another access request that is of the type being monitored (e.g., I/O commands). The method 300 may operate in the above-described fashion for each subject 104 running on the mobile device 102 at any given time. In other words, the method 300 may operate concurrently in the context of multiple application instances or across such instances.

Figure 4A:
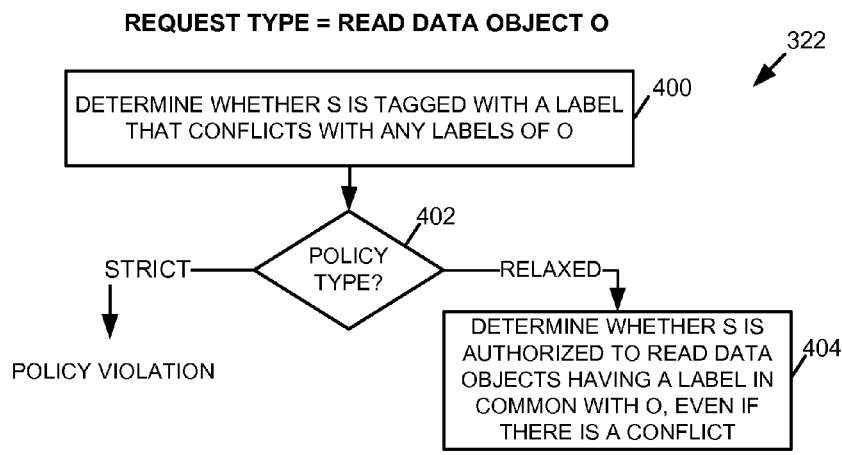
FIGS. 4A-4C are simplified flow diagrams of various aspects of at least one embodiment of the method of FIG. 3.

Referring now to FIG. 4A, an example of read policy logic that may be applied at block 322 of FIG. 3 is shown. At block 400, the application instance S is analyzed to determine whether it is associated with any security labels that conflict with any security label of the object O sought to be read by the instance S. At block 402, the policy type is evaluated (e.g., strict or relaxed). If a relaxed read policy has been implemented, then at block 404 the instance S is further evaluated to determine whether it has been expressly authorized to read objects of O's security label, even if the instance S has been tagged with a conflicting security label. To determine this, the subject tracking data store 130 of the tracking kb 108 may be accessed. If S has been tagged with a conflicting security label (strict read policy), or S has not been otherwise authorized to read objects having O's security label (relaxed read policy), then a policy violation has occurred.

Figure 4B:
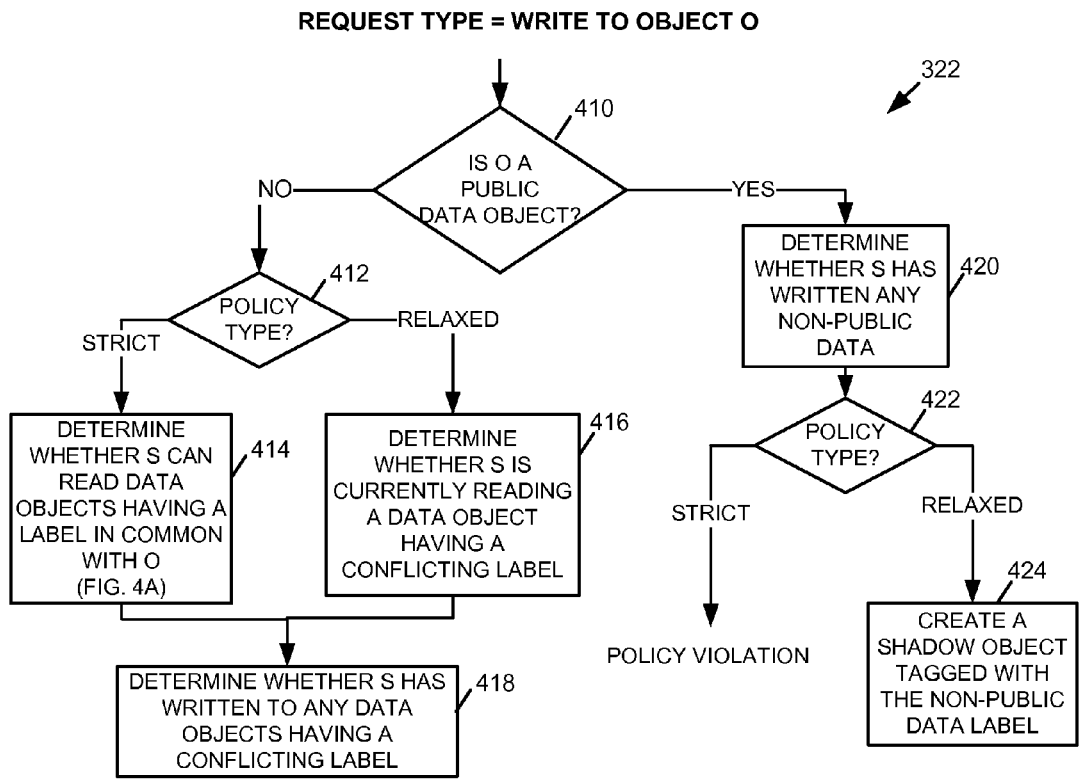
Figure 4C:
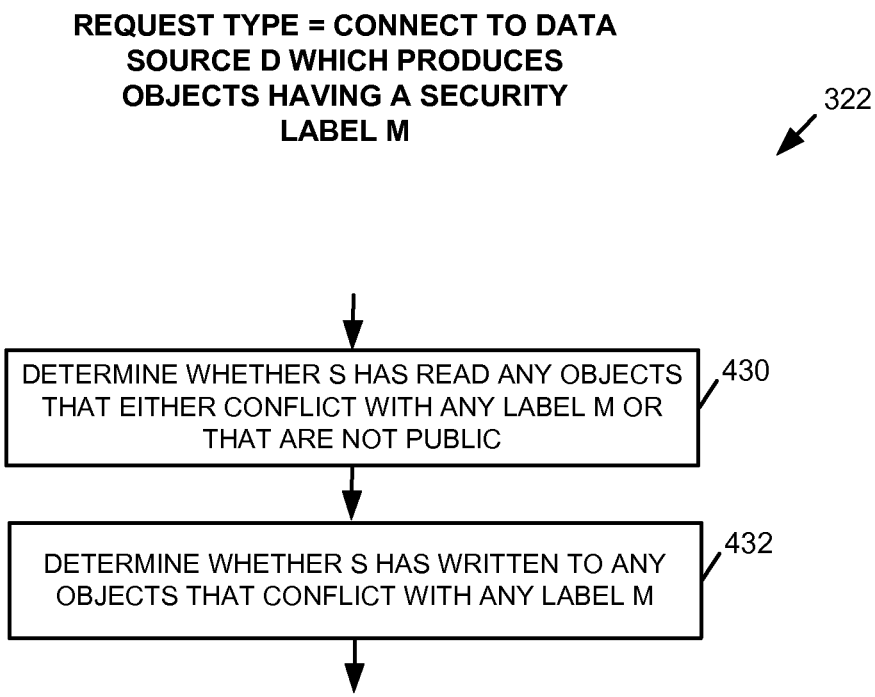

Referring now to FIG. 4B, an example of write policy logic that may be applied at block 322 of FIG. 3 is shown. At block 410, the security label(s) of the object O sought to be written by the instance S are analyzed to determine whether O is a public object. As noted above, data writes to public objects may warrant additional scrutiny in some computing environments. If O is not a public object, then the normal write policy logic (strict or relaxed) is executed at blocks 412 et seq. In the case of a strict write policy, at block 414 the instance S is analyzed to determine whether S can read data objects having O's security label. This can be done, for example, by executing the applicable (e.g., strict or relaxed) read policy of FIG. 4A.

For a relaxed write policy, at block 416 the instance S is analyzed to determine whether it is currently reading a data object having a security label that conflicts with O's security label. This can be done, for example, by analyzing the real-time stream of data access requests (e.g., system calls), which may be tracked by the tracking kb 108. At block 418, the instance S's execution history is evaluated to determine whether S has written to any data objects having a security label that conflicts with O's security label. If the result of block 414 is 'no' and the result of block 418 is 'yes,' or the result of blocks 416 and 418 is both 'yes,' then a policy violation has occurred.

If the data object O sought to be written to by the instance S is a public object, then at block 420, S's execution history is analyzed to determine whether S has written any non-public data (e.g., written to any data object of a security label the conflicts with the public security label). To analyzed S's execution history, the subject tracking data store 130 of the tracking kb 108 may be accessed. Depending on the policy type (e.g., strict or relaxed) (block 422), a policy violation may have occurred (strict) or the public write may be permitted with the creation of a shadow object as described above (relaxed, block 424).

Referring now to FIG. 4C, an example of data source access policy logic that may be applied at block 322 of FIG. 3 is shown. At block 430, the instance S's execution history is analyzed to determine whether S has read any data objects having a security label that conflicts with any security label M of the data source D, or if S has read any non-public data objects (e.g., data objects having a security label that conflicts with the public security label). At block 432, S's execution history is analyzed to determine whether S has written to any data objects having a security label that conflicts with any security label M of the data source D. If S has either read or written any data objects having a conflicting security label, then a policy violation has occurred. As noted above, S's execution history can be tracked by the subject tracking module 122 and the subject tracking data store 130 of the tracking kb 108.

Figure 5:
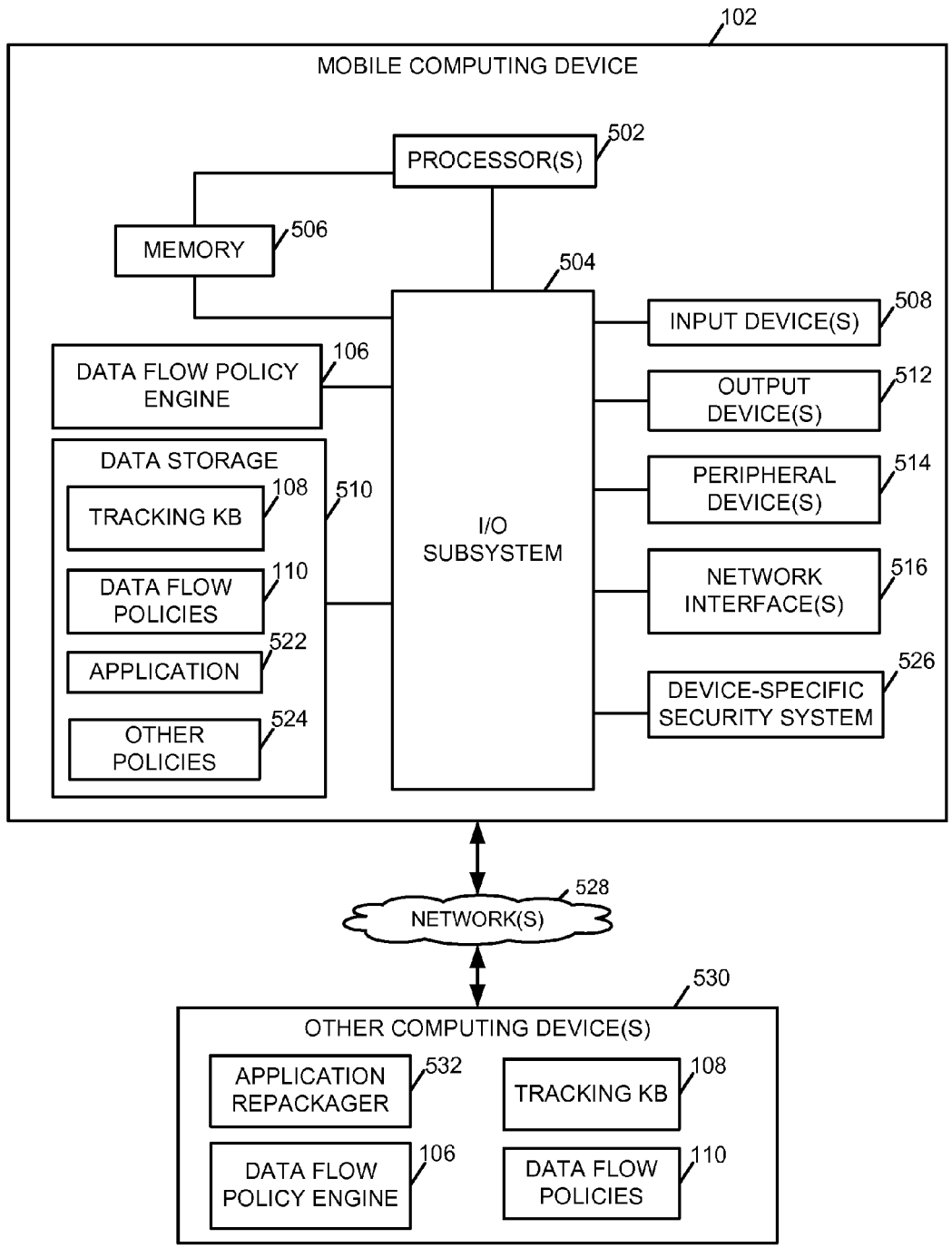
FIG. 5 is a simplified block diagram of at least one embodiment of a computing environment in connection with which aspects of the system of FIG. 1 may be implemented.

Referring now to FIG. 5, an illustrative hardware embodiment of the mobile device 102, in connection with which aspects of the system 100 may be implemented, is shown. Generally speaking, the mobile device 102 may be embodied as any electronic device that has computing capabilities, such as a smartphone, e-reader, tablet computer, netbook, portable media player or recorder, smart TV, smart appliance, heads-up display, body-mounted device, and/or other computing device.

The illustrative embodiment includes at least one processor 502 and an input/output (I/O) subsystem 504, which are communicatively coupled. The processor 502 includes one or more processor cores (e.g. microprocessors, microcontrollers, digital signal processors, etc.). The I/O subsystem 504 typically includes, among other things, an I/O controller, a memory controller, and one or more I/O ports (not shown). The processor 502 and the I/O subsystem 504 are communicatively coupled to a memory 506. The memory 506 may be embodied as any type of suitable memory device, such as a dynamic random access memory device (DRAM), synchronous dynamic random access memory device (SDRAM), double-data rate dynamic random access memory device (DDR SDRAM), and/or other volatile memory device.

The I/O subsystem 504 is communicatively coupled to at least one input device 508, at least one data storage 510, at least one output device 512, one or more peripheral devices 514, at least one network interface 516 and a device-specific security system 526. The input device(s) 508 may include a keyboard, keypad, touch screen, microphone, or other suitable device for accepting input from a user (e.g., via graphical or natural language user interfaces). The output device(s) 512 may include a text, graphics, and/or video display screen, speaker, or other suitable device for presenting output (e.g. warning messages and prompts), to the user. The peripheral device(s) 514 may include, for example, cameras, media players or recorders, GPS devices, graphics, sound and/or video adapters, and/or others, depending upon, for example, the intended use of the mobile device 102. The device-specific security system 526 is, for example, a mobile device-specific system such as an ANDROID-style install-time application permission system.

The network interface 516 communicatively couples the mobile device 102 to one or more networks 528, which may include a cellular or other telecommunications network, local area network, wide area network, personal cloud, enterprise cloud, public cloud, and/or the Internet. Accordingly, the network interface 516 may include a cellular, Ethernet, or WIFI interface or other suitable device as may be needed, pursuant to the specifications and/or design of the particular network 528.

The data storage 510 includes one or more machine-accessible storage media, such as one or more hard drives or other suitable data storage devices (e.g., memory cards, memory sticks, and/or others). Portions of the data flow policy engine 106, the tracking kb 108, the data flow policies 110, other policies 524 (e.g., general device or O/S security policies), one or more security-wrapped applications 522 (e.g., an application that can be invoked to produce the runtime components 104, 112, 114 illustrated in FIG. 1), and/or the device-specific security system 526, may be embodied as software and may reside at least temporarily in the data storage 510. In other embodiments, portions of any of these components may be embodied as firmware, hardware, software, or a combination thereof. Portions of any of these components may be copied to the memory 506 during operation, for faster processing or for other reasons.

In some embodiments, portions of the system 100 may be embodied as a client application or front-end user interface, while a back end or server portion may reside on one or more other computing devices 530 on the network 528. For example, a user interface may permit the user or administrator to create, modify, and/or update the data flow policies 110 at the mobile device 102.

The data flow policies 110 may include some policies that are local to the mobile device 102, such as user-, device-, and/or application-specific policies. Other aspects of the data flow policies 110 (which may be user-, device-, and/or application-independent, for example), may reside on other devices 530 connected to the network 528. Similarly, portions of the data flow policy engine 106 and/or the tracking kb 108 may be distributed among multiple devices 530 across the network 528.

As discussed above and in the cross-referenced application, the system 100 may include an application repackager or wrapper module 532, which may be used to create the security-wrapped applications 522. While shown in FIG. 5 as being accessible via the network 528, the application repackager 532 or portions thereof may be local to the mobile device 102. In other words, a software application may be security-wrapped either before or after it is downloaded to or otherwise installed on the mobile device 102.

In some embodiments, the system 100 may be launched automatically each time a user boots the mobile device 102. In other embodiments, the system 100 may be invoked according to parameters or conditions set by, e.g., a user or system administrator. For example, in some embodiments, the system 100 may be launched only if the user begins using a particular type of application.

The mobile device 102 may include other components, sub-components, and devices not illustrated in FIG. 5 for clarity of the description. In general, the components of the mobile device 102 are communicatively coupled as shown in FIG. 5 by one or more signal paths that may be embodied as any type of wired or wireless signal paths capable of facilitating communication between the respective components and/or devices.

In the present description, numerous specific details are set forth in order to provide a more thorough understanding of the present disclosure. It will be appreciated, however, that embodiments may be practiced without such specific details. In some instances, details such as control structures and full software instruction sequences have not been shown in order not to obscure the invention. Those of ordinary skill in the art, with the included descriptions, should be able to implement appropriate functionality without undue experimentation.

References in the specification to "an embodiment," "an illustrative embodiment," etc., indicate that the embodiment described may include a particular feature, structure, or characteristic, but every embodiment may not necessarily include the particular feature, structure, or characteristic. Moreover, such phrases are not necessarily referring to the same embodiment. When a particular feature, structure, or characteristic is described in connection with an embodiment, it should be within the knowledge of one skilled in the art to effect such feature, structure, or characteristic in connection with other embodiments whether or not explicitly described.

In the drawings, elements may be arranged for ease of description. Such arrangements are not meant to imply that a particular order of processing or separation of processes is required. Elements used to represent instruction blocks may be implemented using any suitable form of machine-readable instructions, such as software or firmware applications, programs, and the like, and each instruction may be implemented using any suitable programming languages and/or tools. Elements used to represent data may be implemented using any suitable electronic arrangement, such as a data file, database, table, and/or others. Also, some connections, relationships or associations between elements may not be shown in the drawings so as not to obscure the invention.

While aspects of this disclosure have been illustrated and described in detail in the drawings and in the foregoing description, such illustrations and description are to be considered as exemplary and not restrictive in character, it being understood that only illustrative embodiments have been shown and described and that all changes and modifications that come within the spirit of the disclosure are desired to be protected. Further, while certain aspects of the present disclosure have been described in the context of an exemplary smartphone implementation, it will be understood that the various aspects are applicable to other mobile device configurations.

The invention claimed is:

1. A data flow policy evaluation system for a mobile computing device embodied as executable instructions in one or more non-transitory machine-accessible storage media, comprising:
one or more hardware processors coupled to the media and executable by the one or more hardware processors:
a system call monitor to monitor system calls made by a plurality of security-wrapped software applications during execution of the security-wrapped software applications at the mobile computing device; and
a data flow policy engine to generate policy decisions to enable the security-wrapped software applications to prevent the execution of system calls that would violate a data flow policy, wherein the data flow policy defines security labels, associates data flow policies with the security labels, and associates data objects with the security labels, and the data flow policy engine is configured to:
associate an executing process of a security-wrapped software application with a security label in response to the process accessing a data object having the security label; and
associate another executing process with the security label in response to wherein the other executing process is in communication with the executing process;
wherein the data flow policy engine further defines each security label as either public or private;
wherein the system permits the executing instance of the security-wrapped software application to write data associated with a public security label only when:
the security-wrapped software application has not read data associated with a private security label; and
the security-wrapped software application has not written data associated with the private security label.

2. The system of claim 1, comprising an access interceptor configured to prevent the security-wrapped software application from executing any system call that would violate the data flow policy.

3. The system of claim 1, wherein the other executing process is a software application process invoked by the executing process.

4. The system of claim 1, wherein the data flow policy engine associates the other executing process with the security label in response to the other executing process reading data from memory to which data has been written by the executing process.

5. A system for evaluating data access requests at a mobile computing device, embodied as executable instructions in one or more non-transitory machine-accessible storage media, comprising:
one or more hardware processors coupled to the media and executable by the one or more hardware processors:
a system call monitor to monitor system calls relating to data accesses made by an instance of a security-wrapped software application executing on the mobile computing device; and
a data flow policy engine to:
associate data access tracking data with the instance of the security-wrapped software application, wherein the data access tracking data relates to data objects accessed by the instance and security labels associated with the data objects, and the security labels indicate conflicts of interest between or among the data objects; and
generate data flow policy decisions based on the data access tracking data, wherein the policy decisions are based on and in response to one or more current and one or more previous data accesses made by the instance;
wherein the data flow policy engine further defines each security label as either public or private;

wherein the system permits the executing instance of the security-wrapped software application to write data associated with a public security label only when:

the security-wrapped software application has not read data associated with a private security label; and the security-wrapped software application has not written data associated with the private security label.

6. The system of claim 5, wherein the data flow policy engine stores data access tracking data associated with each instance of the security-wrapped software application.

7. The system of claim 5, wherein the data access tracking data indicates data that has been read by the executing instance of the security-wrapped software application, data that is currently being read by the instance, and data that has been written by the instance.

8. The system of claim 7, wherein the data flow policy engine separately associates data access tracking data with each instance of the security-wrapped software application.

9. The system of claim 7, wherein the system permits the executing instance of the security-wrapped software application to read data associated with a security label only in response to wherein the instance has not read data associated with another security label that is in conflict with the security label.

10. The system of claim 7, wherein the system permits the executing instance of the security-wrapped software application to read data associated with a plurality of security labels only in response to wherein the instance is authorized to read data associated with each of security labels.

11. The system of claim 7, wherein the system permits the executing instance of the security-wrapped software application to read data associated with a plurality of security labels even if the instance is not authorized to read data associated with each of the security labels, in response to the instance being authorized to read data associated with at least one of the security labels.

12. The system of claim 7, wherein the system permits the executing instance of the security-wrapped software application to write data associated with a plurality of security labels only in response to:

the instance is authorized to read data associated with each of the security labels; and the instance has not written data associated with another security label that is in conflict with any of the security labels.

13. The system of claim 7, wherein the system permits the executing instance of the security-wrapped software application to write data associated with one or more security labels only in response to:

the instance is not currently reading data associated with another security label that is in conflict with any of the security labels; and the instance has not written data associated with another security label that is in conflict with any of the one or more security labels.

14. A system for enforcing a data flow policy at a mobile computing device, embodied as executable instructions in one or more non-transitory machine-accessible storage media, the system comprising:

one or more hardware processors coupled to the media and executable by the one or more hardware processors:

a system call monitor to monitor system calls made by an instance of a security-wrapped software application executing on the mobile computing device;

a data flow policy engine to:

analyze the system calls using a data flow policy, wherein the data flow policy associates security labels with data objects and the security labels indicate conflicts of interest between or among data objects, associate a data object with a security label in response to the data object is produced by a data source having the security label or in response to the data object is created by a software application process having the security label, and associate the instance with the security label in response to the instance accessing the data object and the data object is associated with the security label;

a data flow policy enforcer to prevent the instance from executing a system call that violates the data flow policy; and wherein the data flow policy engine further defines each security label as either public or private;

wherein the system permits the executing instance of the security-wrapped software application to write data associated with a public security label only when;

the security-wrapped software application has not read data associated with a private security label; and the security-wrapped software application has not written data associated with the private security label.

15. The system of claim 14, wherein the data object may be associated with more than one security label.

* * * * *